US009532293B2

(12) United States Patent
Koodli et al.

(10) Patent No.: US 9,532,293 B2
(45) Date of Patent: Dec. 27, 2016

(54) LOCALIZED FORWARDING

(75) Inventors: Rajeev Koodli, Sunnyvale, CA (US); Kuntal Chowdhury, Andover, MA (US); Rajesh Ramankutty, Nashua, NH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1068 days.

(21) Appl. No.: 12/726,906

(22) Filed: Mar. 18, 2010

(65) Prior Publication Data

US 2010/0238887 A1    Sep. 23, 2010

Related U.S. Application Data

(60) Provisional application No. 61/161,403, filed on Mar. 18, 2009.

(51) Int. Cl.
*H04W 36/38* (2009.01)
*H04W 36/32* (2009.01)
*H04L 12/14* (2006.01)
*H04L 29/06* (2006.01)
*H04W 12/02* (2009.01)

(52) U.S. Cl.
CPC ........... *H04W 36/385* (2013.01); *H04W 36/32* (2013.01); *H04L 12/14* (2013.01); *H04L 63/304* (2013.01); *H04W 12/02* (2013.01)

(58) Field of Classification Search
CPC .... H04W 12/02; H04W 36/385; H04W 36/32; H04L 63/304; H04L 12/14
See application file for complete search history.

(56) References Cited

U.S. PATENT DOCUMENTS

| 5,898,713 A | 4/1999 | Melzer et al. |
| 6,522,880 B1 | 2/2003 | Verma et al. |
| 6,643,621 B1 | 11/2003 | Dodrill et al. |
| 6,654,792 B1 | 11/2003 | Verma et al. |
| 6,917,592 B1 | 7/2005 | Ramankutty et al. |
| 6,922,411 B1 | 7/2005 | Taylor |
| 6,993,359 B1 | 1/2006 | Nelakanti et al. |

(Continued)

FOREIGN PATENT DOCUMENTS

| EP | 1250022 A1 | 10/2002 |
| EP | 1619917 A1 | 1/2006 |

(Continued)

OTHER PUBLICATIONS

International Search Report and Written Opinion issued for International Application No. PCT/US2010/027825, dated Aug. 4, 2010, 2 pages.

(Continued)

*Primary Examiner* — Jackie Zuniga Abad
(74) *Attorney, Agent, or Firm* — Patent Capital Group

(57) ABSTRACT

Systems and methods for call localization are provided. The call localization can be provided in a radio access network by detecting a call flow between mobile node such as user equipment (UE) served by the same radio access network device. For example, a gateway can detect a call localization opportunity and the call can be localized with an evolved nodeB (eNB). The method provides for efficient routing, reporting of billing information, lawful monitoring, and mobility if one or both user equipment leave the common eNB.

18 Claims, 4 Drawing Sheets eNB Localized Forwarding

(56) References Cited

U.S. PATENT DOCUMENTS

| | | | |
|---|---|---|---|
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 8,064,909 B2 | 11/2011 | Spinelli et al. | |
| 2003/0028644 A1 | 2/2003 | Maguire et al. | |
| 2004/0088385 A1 | 5/2004 | Blanchet et al. | |
| 2004/0136337 A1 | 7/2004 | Warrier et al. | |
| 2004/0224678 A1 | 11/2004 | Dahod et al. | |
| 2004/0236855 A1 | 11/2004 | Peles | |
| 2005/0025132 A1 | 2/2005 | Harper et al. | |
| 2005/0078691 A1 | 4/2005 | Davison et al. | |
| 2005/0091371 A1 | 4/2005 | Delegue et al. | |
| 2005/0239473 A1 | 10/2005 | Pan et al. | |
| 2005/0286504 A1 | 12/2005 | Kwon | |
| 2006/0018328 A1 | 1/2006 | Mody et al. | |
| 2006/0056446 A1 | 3/2006 | Lee et al. | |
| 2006/0268900 A1 | 11/2006 | Larsson et al. | |
| 2006/0268901 A1 | 11/2006 | Choyi et al. | |
| 2007/0097983 A1 | 5/2007 | Nylander et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0243872 A1 | 10/2007 | Gallagher et al. | |
| 2007/0253328 A1 | 11/2007 | Harper et al. | |
| 2007/0253371 A1* | 11/2007 | Harper et al. | 370/331 |
| 2008/0009286 A1 | 1/2008 | Hur et al. | |
| 2008/0137541 A1 | 6/2008 | Agarwal et al. | |
| 2008/0176582 A1 | 7/2008 | Ghai et al. | |
| 2008/0298309 A1 | 12/2008 | DePietro et al. | |
| 2008/0310404 A1 | 12/2008 | Valme et al. | |
| 2008/0316980 A1 | 12/2008 | Ahlen et al. | |
| 2009/0047931 A1 | 2/2009 | Nanda et al. | |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0086742 A1 | 4/2009 | Ghai et al. | |
| 2009/0089447 A1 | 4/2009 | Balachandran et al. | |
| 2009/0093246 A1 | 4/2009 | Czaja et al. | |
| 2009/0097448 A1 | 4/2009 | Vasudevan et al. | |
| 2009/0098872 A1 | 4/2009 | Deshpande et al. | |
| 2009/0156213 A1* | 6/2009 | Spinelli et al. | 455/436 |
| 2009/0215438 A1 | 8/2009 | Mittal et al. | |
| 2009/0268635 A1* | 10/2009 | Gallagher et al. | 370/254 |
| 2010/0077102 A1 | 3/2010 | Lim et al. | |
| 2010/0091653 A1 | 4/2010 | Koodli et al. | |
| 2010/0124933 A1 | 5/2010 | Chowdhury et al. | |
| 2010/0195640 A1 | 8/2010 | Park et al. | |
| 2010/0291897 A1 | 11/2010 | Ghai | |
| 2011/0021192 A1 | 1/2011 | Grayson et al. | |
| 2011/0021196 A1 | 1/2011 | Grayson et al. | |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |

FOREIGN PATENT DOCUMENTS

| | | |
|---|---|---|
| EP | 1622314 A1 | 2/2006 |
| EP | 1933520 A1 | 6/2008 |
| EP | 1978685 A1 | 10/2008 |
| WO | WO-2007/120915 A2 | 10/2007 |
| WO | WO2009/055827 | 4/2009 |
| WO | WO-2009089455 A1 | 7/2009 |
| WO | WO2010/108009 | 9/2010 |

OTHER PUBLICATIONS

Chowdhury, K., "Fast Handoff support for HRPD," 3rd Generation Partnership Project 2, "3GPP2," Apr. 24, 2006, 22 pgs.

Chowdhury, K., "Network Based L3 Connectivity and Mobility Management for IPv4," draft-chowdhury-netmip4-00.txt, Feb. 25, 2006, http://tools.ietf.org/hmtl/draft-chowdhury-netmip4-00, 15 pgs.

Devarapalli, V. et al., "Proxy Mobile IPv6 and Mobil IPv6 interworking," draft-devarapalli-netlmm-pmipv6-mipv6-00.txt, NETLMM Working Group, Internet Draft, Apr. 10, 2007, http://tools.ietf.org/html/draft-devarapalli-netlmm-pmipv6-mipv6-00, 9 pgs.

Lior, A. et al., "Mobile IP Key Derivation using EAP," draft-lior-mipkeys-eap-00, Network Working Group, Feb. 25, 2006, http://tools.ietf.org/html/draft-lior-mipkeys-eap-00, 17 pgs.

Navali, J. et al., "IPv6 over Network based Mobile IPv4," draft-navali-ip6-over-netmip4-00.txt, Network Working Group, Feb. 25, 2006, http://tols.ietf.org/html/draft-navali-ip6-over-netmip4-00, 20 pgs.

Chowdhury, K. et al., "Network Based Layer 3 Connectivity and Mobility Management for IPv6," draft-chowdhury-netmip6-01.txt Network Working Group, Internet Draft, Sep. 8, 2006, http://tools.ietf.org/html/draft-chowdhury-netmip6-01, 20 pgs.

3GPP TR 25.820 v8.0.0 (Mar. 2008), 3rd Generation Partnership Project; Technical Specification Group Radio Access Networks; 3G Home Node B Study Item Technical Report (Release 8); http://www.3gpp.org, 2008. 37 pages.

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.

3GPP TR. 23.829 v. 10.0.1 Technical Specification. "3rd Generation Partnership Project; Technical Specification Group Services and System Aspects; Local IP Access and Selected IP Traffic Offload (LIPA-SIPTO) (Release 10)." Oct. 2011, 43 pages.

3GPP TS 22.011 v8.4.0 (Jun. 2008), 3rd Generation Partnership Project; Technical Specification Group Services and System Aspects; Service accessibility (Release 8), Global System for Mobile Communications, http://www.3gpp.org, 2008. 25 pages.

3GPP TS 22.220 v0.3.0 (Jul. 2008), 3rd Generation Partnership Project; Technical Specification Group Services and System Aspects; Service requirements for Home NodeBs and Home eNodeBs; (Release 9), http://www.3gpp.org, 2008, 13 pages.

3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.

3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.

3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.

3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.

3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.

3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.

3GPP TS 23.236 v. 10 Technical Specification. "3rd Generation Partnership Project; Technical Specification Group Services and Systems Aspects; Intra-Domain Connection of Radio Access Network (RAN) Nodes to Multiple Core Network (CN) Nodes (Release 10)." Mar. 2010. 39 pages.

(56) References Cited

OTHER PUBLICATIONS

3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.
3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7), Global System for Mobile Communications, http://www.3gpp.org, 2007. 32 pages.
3GPP TS 25.410 v7.0.0 (Mar. 2006), 3rd Generation Partnership Project; Technical Specification Group Radio Access Network; UTRAN Iu Interface: general aspects and principles (Release 7), http://www.3gpp.org, 2006, 28 pages.
3GPP TS 25.411 v7.1.0 (Sep. 2007); 3rd Generation Partnership Project; Technical Specification Group Radio Access Network; UTRAN Iu interface layer 1 (Release 7), http://www.3gpp.org, 2007, 9 pages.
3GPP TS 25.412 v7.1.0 (Jun. 2006), 3rd Generation Partnership Project; Technical Specification Group Radio Access Network; UTRAN Iu interface signaling transport (Release 7), http://www.3gpp.org, 2006 (11 pages).
3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007, 359 pages.
3GPP TS 25.414 v7.1.0 (Sep. 2006), 3rd Generation Partnership Project; Technical Specification Group Radio Access Network; UTRAN Iu interface transport and transport signaling (Release 7), http://www.3gpp.org, 2006, 20 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.
3GPP TS 25.419 v7.0.0 (Mar. 2006), 3rd Generation Partnership Project; Technical Specification Group RAN; UTRAN Iu-BC Interface: Service Area Broadcast Protocol (SABP) (Release 7), http://www.3gpp.org, 2006. 77 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signaling (Release 8), Global System for Mobile Communications, http://www.3gpp.org, 2008, 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
3GPP TS 33.234 v8.1.0 (Mar. 2008), 3rd Generation Partnership Project; Technical Specification Group Service and System Aspects; 3G Security; Wirelss Local Area Network (WLAN) interworking security (Release 8), http://www.3gpp.org, 2008. 101 pages.
3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.
3GPP TS. 23.203 v. 11.3.0 Technical Specification. "3rd Generation Partnership Project; Technical Specification Group Services and System Aspects; Policy and charging control architecture (Release 11)", Sep. 2011, 167 pages.
3GPP TS. 23.401 v. 10.5.0 Technical Specification. "3rd Generation Partnership Project; Technical Specification Group Services and System Aspects: General Packet Radio Service (GPRS) enhancements for Evolved Universal Terrestrial Radio Access Network (E-UTRAN) access (Release 10)." Sep. 2011, 282 pages.
International Written Opinion issued for corresponding International Patent Application No. PCT/US2008/081389, dated Dec. 29, 2008, 3 pages.
European Search Report and Written Opinion Issued by the European Patent Office for European Application No. 08842061.7-1855 mailed Apr. 14, 2014 (6 pgs.).
Starent Networks, Corp. ST Series, Multimedia Core Platforms. 4 pages.
Starent Networks. Connectivity for the UMTS/HSPA packet core. 4 pages.
Starent Networks. Service Convergence Platform. CTIA Wireless. 2009. 3 pages.
T. Dierks et al. The TLS Protocol: Version 1.0. Network Working Group. Certicom, Jan. 1999. 56 pages.
T. Dierks et al. The Transport Layer Security (TLS) Protocol: Version 1.2. Network Working Group. RTFM, Inc. Aug. 2008. 72 pages.
PCT Aug. 27, 2010 International Preliminary Report on Patentability from International Application No. PCT/US2008/081389.
PCT Sep. 20, 2011 International Preliminary Report on Patentability from International Application PCT/US2010/027825.

* cited by examiner

US 9,532,293 B2

LOCALIZED FORWARDING

CROSS-REFERENCE TO RELATED APPLICATION

This application claims priority under 35 U.S.C. Section 119(e) to Application Ser. No. 61/161,403, filed Mar. 18, 2009, which is incorporated herein by reference.

FIELD OF THE DISCLOSURE

This disclosure relates to the field of telecommunications, and more particularly, a system and method for providing localization of packet flows in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and Hiper-MAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

SUMMARY OF THE DISCLOSURE

Systems and methods for call localization are provided. The call localization can be provided in a radio access network by detecting a call flow between mobile node, such as between user equipment (UE) served by the same radio access network (RAN) device. For example, a gateway can detect a call localization opportunity and the call can be localized with an evolved nodeB (eNB). The method provides for efficient routing, reporting of billing information, lawful monitoring, and mobility if one or both user equipment leave the common eNB.

DETAILED DESCRIPTION

Systems and methods are disclosed that provide localization of packet flows in a communication network. The localization allows a packet flow to be confined within the radio access network and to go from a first mobile to a second mobile efficiently, bypassing other network devices. The packet flows can be voice calls in which one or more mobile nodes (e.g., user equipment) are serviced by the same radio access network (RAN). The RAN can be an evolved nodeB, a radio network controller, a base station controller, or any other device that can confine the data path to localize a call between mobile devices communicating using the same device. A mechanism for call localization can be developed to detect a communication path that is confinable to the RAN, to signal information from the RAN, and to fallback to gateway forwarding in the event of a handover.

Figure 1:
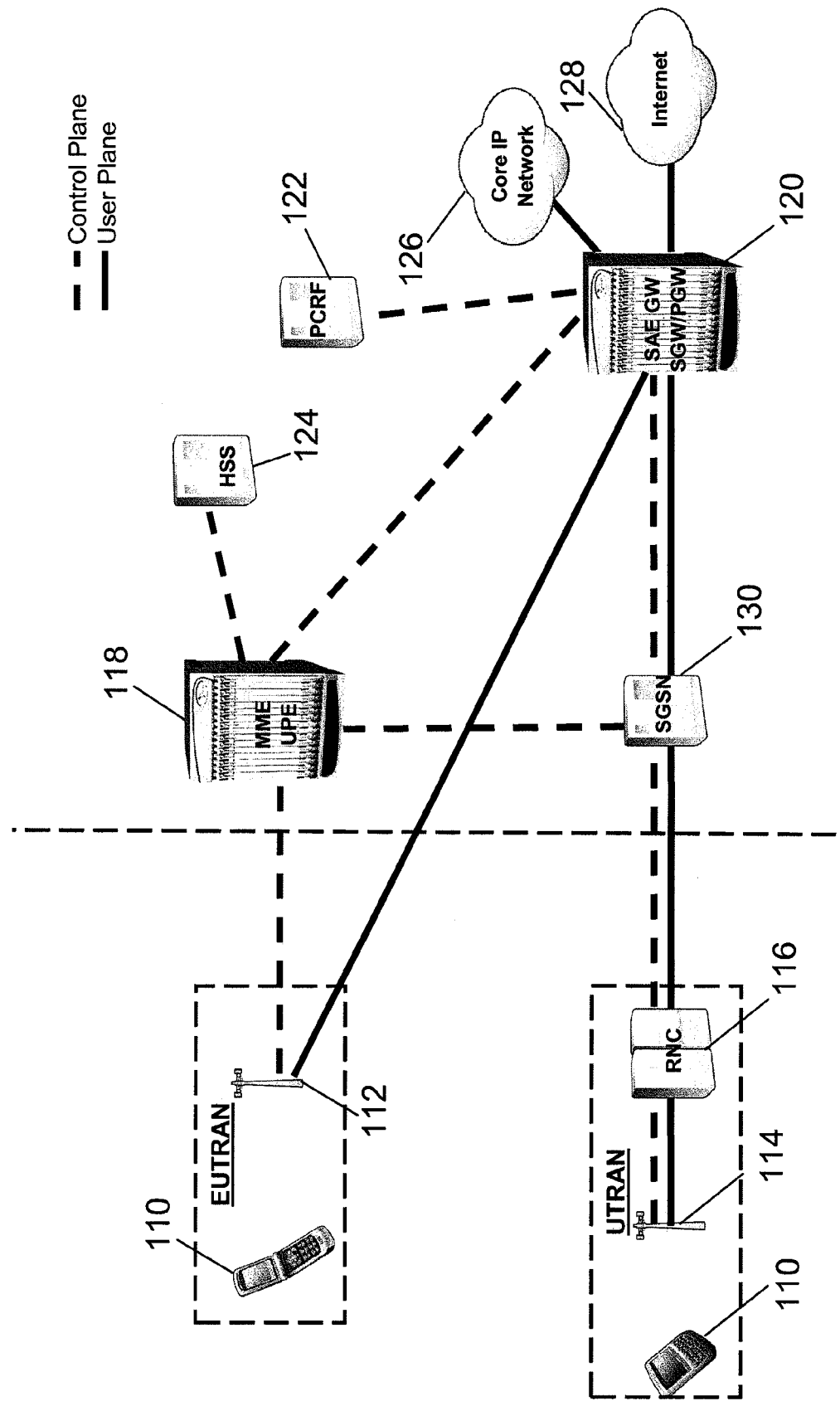
FIG. 1 illustrates a network diagram in accordance with certain embodiments.

FIG. 1 illustrates an implementation in a long term evolution (LTE) network in accordance with certain embodiments. FIG. 1 illustrates both a universal mobile telecommunication system (UMTS) release 8 network and a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, interne 128, and Serving General packet radio service Support Node (SGSN) 130. The MME 118, SAE GW 120, and SGSN 130 can be implemented in a chassis as described below. The SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 118 is a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO). The SGW or the PGW depending on the embodiment, can be used to provide deep packet inspection and provide advertising to the user on a per subscriber basis as described above on a chassis implementing a SGW or a PGW.

Figure 2:
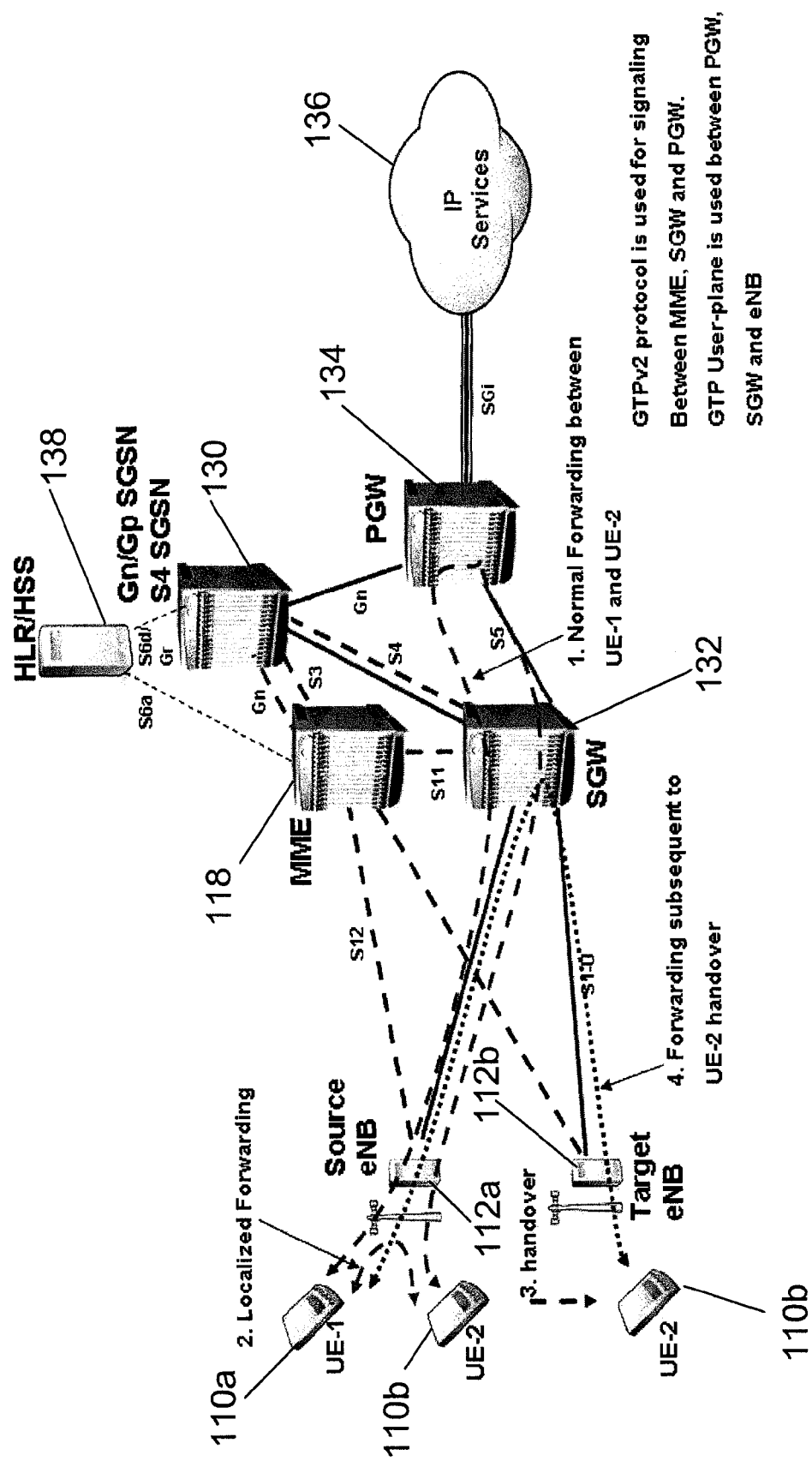
FIG. 2 illustrates a network with localization of packet flows in accordance with certain embodiments.

FIG. 2 illustrates a network with localized packet flows in accordance with certain embodiments. FIG. 2 includes user equipment 110*a* and 110*b*, source eNB 112*a*, target eNB 112*b*, MME 118, SGSN 130, SGW 132, PGW 134, IP services 136, and home location register (HLR)/HSS 138. As shown in item 1, forwarding between UE 110*a* and UE 110*b* at source eNB 112*a* passes through SGW 132 and PGW 134. By routing the packet flow through SGW 132 and PGW 134, bandwidth and network resources are used by the network that can be reduced by confining the packet flow between UEs 110*a* and 110*b*. As shown in item 2, localized forwarding can allow a packet flow to be forwarded from a first UE 110*a* to a second UE 110*b*, without passing through the SGW 132 and PGW 134. In the event of a handover (item 3) from source eNB 112*a* to target eNB 112*b* of UE 110*b*, the localized forwarding mechanism can provide a handover and pass the packet flow through SGW 132 (item 4). References to S5, S12, S6a, S11, Gn, etc. are to known interfaces between components.

Figure 3:
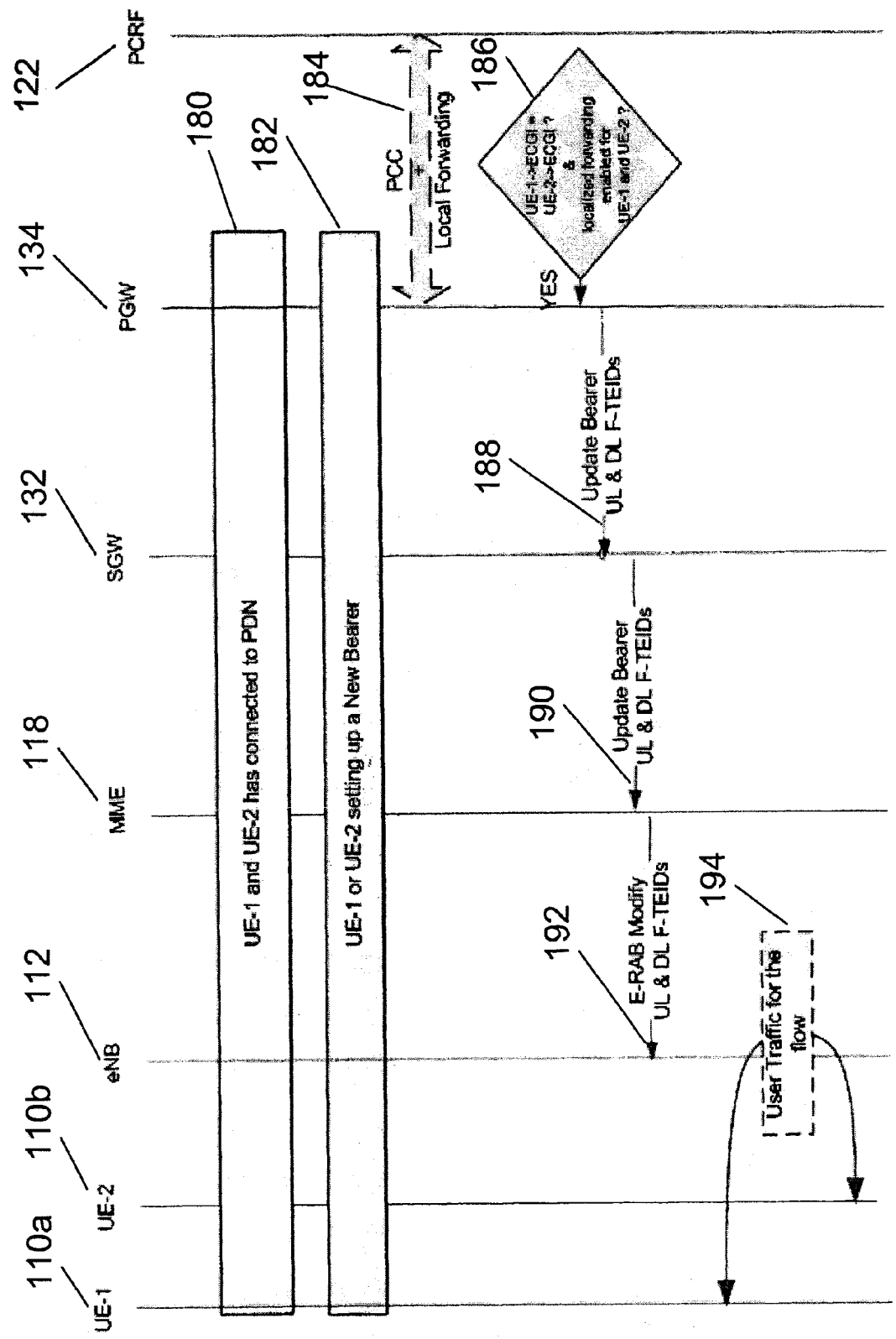
FIG. 3 illustrates a signaling diagram in accordance with certain embodiments.

FIG. 3 illustrates a call flow diagram for packet flow localization in accordance with certain embodiments. In reference 180, UE 110*a* and UE 110*b* establish a connection to the packet data network (PDN) through PGW 134. In reference 182, UE 110*a* and UE 110*b* set up a new bearer which can transfer packet data to and from the PDN. The bearer can be a tunnel initiated between the user equipment (UE) and the PGW 134. A policy and charging rules function (PCRF) 122 can optionally exchange policy and charging control messaging and local forwarding rules with either PGW 134 or SGW 132. In reference 186, rules for detecting packet flow localization can be sent to the gateway. The rules can specify what identifying information to use to determine when user equipment packet flows can be localized. The rules can also specify under what conditions the localization occurs, e.g., are certain services provided to the packet flow where localization is not desired. The identifying information can be the IP address, uplink and downlink tunnel endpoint identifiers (such as fully qualified tunnel endpoint identifier (F-TEID)), cell id, and location information for example.

In reference 188, an update bearer message is sent from PGW 134 to SGW 132 with identifying information such as uplink (UL) and downlink (DL) F-TEIDs. An update bearer message is sent from SGW 132 to MME 118, in reference 190, with identifying information such as UL and DL F-TEIDs. In reference 192, an evolved radio access bearer modify message is sent from MME 118 to eNB 112 with identifying information such as UL and DL F-TEIDs. The eNB 112 can use this information in reference 194 to provide localization of packet flows between UE 110*a* and UE 110*b*. The eNB 112 can forward the packets received from UE 110*a* to UE 110*b* and vice versa. The eNB 112 can also send periodic updates to either PGW 132 or SGW 132 to update billing information or other functions.

Localized forwarding within the LTE RAN enables the data path to be confined to the eNB when at least two communicating UE's are attached to the same eNB. The mechanism for this feature can comprise the following components: (i) detection of a communication path as confinable to an eNB, (ii) signaling mechanism, and enforcement of intra-eNB forwarding; and (iii) fallback to intra-SGW forwarding in the event of inter-eNB handover.

The detection of the communication path can be implemented in a PGW or in an SGW. The sequence of events occurs between the UE, the PGW, and SGW. At the time of initial attach, the User Location Information (ULI) of the UE can be reported in terms of an Enhanced Cell Global Identifier (ECGI) to the gateways (e.g., in a GTPv2 Create Session Request message). A gateway (PGW/SGW) maintains a set of UE's with the same ECGI value in a data structure. A policy flag denoting whether localized forwarding is supported for a UE is also maintained as part of UE context (e.g., a session or other data structure) at the gateways. In some embodiments, when a packet arrives from UE-1 to UE-2 at a gateway, the gateway verifies this logic: (1) if UE-1->ECGI=UE-2->ECGI, AND (2) if policy for localized forwarding is enabled for both the UEs (e.g., if UE-1 RAN identifying information matches UE-2 RAN identifying information and policy is enabled allow localized forwarding).

If the above conditions are met, then the flow is a candidate for localized forwarding at the eNB. In the absence of ULI information, the following mechanism can be used at the SGW to detect a flow as confinable to an eNB under these conditions: if the Destination IP address in the inner IP packet (i.e., UE's payload packet) from the eNB matches the destination IP address in the inner IP packet from the PGW and SGW. If the source IP address of the outer IP packet (i.e., eNB's IP address) matches the stored destination IP address for the outer IP packet when a packet arrives from the PGW. Then the flow can be confinable to the same eNB subject to policy rules.

When a detection mechanism is implemented at the PGW, the sequence of events can be as follows. A trigger (such as PCRF interaction) indicates the applicability of localized forwarding. The PGW sends a message—such as a GTPv2 Update Bearer Request message containing the U-plane F-TEID of the uplink and downlink flows as part of the Bearer Context IE (information element). The SGW sends a message—such as a GTPv2 Update Bearer Request message to the MME providing its own uplink and downlink U-plane F-TEIDs for the bearer. The uplink F-TEID can identify the traffic from the eNB to SGW, and downlink F-TEID can identify the traffic from the SGW to the eNB. Both of these F-TEIDs can be established a priori (through appropriate GTPv2 messages—such as Create Session Request, Modify Bearer Request). At that point, the MME sends a S1-AP message—such as E-RAB Modify Request to the eNB in which it includes the uplink and downlink F-TEID's. The additional parameters can be added to the messages as optional parameters.

Once it processes the message from the MME, the eNB can insert the following forwarding rule: "Upon receiving a packet from the UE, lookup if there is a matching entry for localized forwarding (i.e., if the uplink F-TEID for the packet has a corresponding entry for the downlink)". If an entry exists for localized forwarding, forward locally; else forward using the normal procedure. If forwarding locally, perform one or more of the following: Update statistics; billing; lawful interception; or other functions as necessary. In this embodiment, the eNB responds to the MME with an E-RAB Modify Response.

When a detection mechanism is implemented at the SGW, the SGW interaction with the MME and the MME interaction with the eNB is the same as in the case of detection based at the PGW. In addition, the SGW informs the PGW about the localized forwarding by sending a message—such as a GTPv2 Modify Bearer Request with "Localized Forwarding" set to 1 as part of the Indication IE, and includes the EPS Bearer ID in the Bearer Context IE. The PGW responds with a message—such as a GTPv2 Modify Bearer Response. The rest of the mechanism can be the same as described earlier.

A handover procedure where a UE moves from a localized packet flow to another eNB can be handled as follows. One of the UEs whose traffic is forwarded locally may undergo handover to another eNB served by the same SGW. In some embodiments, the source eNB is informed to forward packets back to the SGW as soon as possible. This can be achieved using the following: the MME receives a Path Switch Request message from the target eNB (see X2-based handover, TS 23.401). Then, the MME sends an E-RAB Modify Request message to the source eNB instructing it to stop performing localized forwarding. The source eNB deletes the localized forwarding state; specifically, it deletes the F-TEID used for forwarding locally. The source eNB confirms by sending E-RAB Modify Response message. Then, the source eNB resumes forwarding uplink packets to the SGW, as it would without localized forwarding. Once the path switch occurs (i.e., the MME updates the S1-U tunnel with Modify Bearer Request/Response messages) the SGW continues to forward locally (to the target eNB) without having to forward the packets to PGW.

In some embodiments, the localization can be achieved by determining a node is a common tunnel initiator (e.g., shared by at least two devices on the same call session) and then bypassing the tunnel terminator(s) of the call session. The localization can also reduce packet latency and jitter by eliminating the backhaul network hops. The localization can be implemented using data structures in a gateway and intra-eNB forwarding. The data structure can include sessions which are associated with information regarding a particular tunnel and UE. The session can be used to process the data packets and performs tasks such a billing updates and policy enforcement. A session manager can be used to monitor the session and instruct the processor regarding packet flows related to the session. In some embodiments, localization can be implemented by checking certain conditions. For example, checking whether the destination IP address of the packet matches the IP address of another session on the device. If these conditions are met, in certain embodiments, the software delivers the packet to the matching session. In some embodiments, a flow-based filter such as a traffic flow template (TFT) that uses a combination of criteria such as: source and destination IP address, protocol used, and source and destination port numbers to determine matching sessions. The eNB or localization RAN may send periodic statistics updates to the tunnel terminator or gateway to inform it about locally forwarded packets. This allows the tunnel terminator to update other call parameters such as idle time. The eNB may generate accounting records for localized packet traffic. This may be done using statistics on the packets. The eNB can send accounting information to tunnel terminator so the tunnel terminator can update accounting parameters for the bridged traffic. This update could be periodic or event driven.

The chassis described above can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 4:
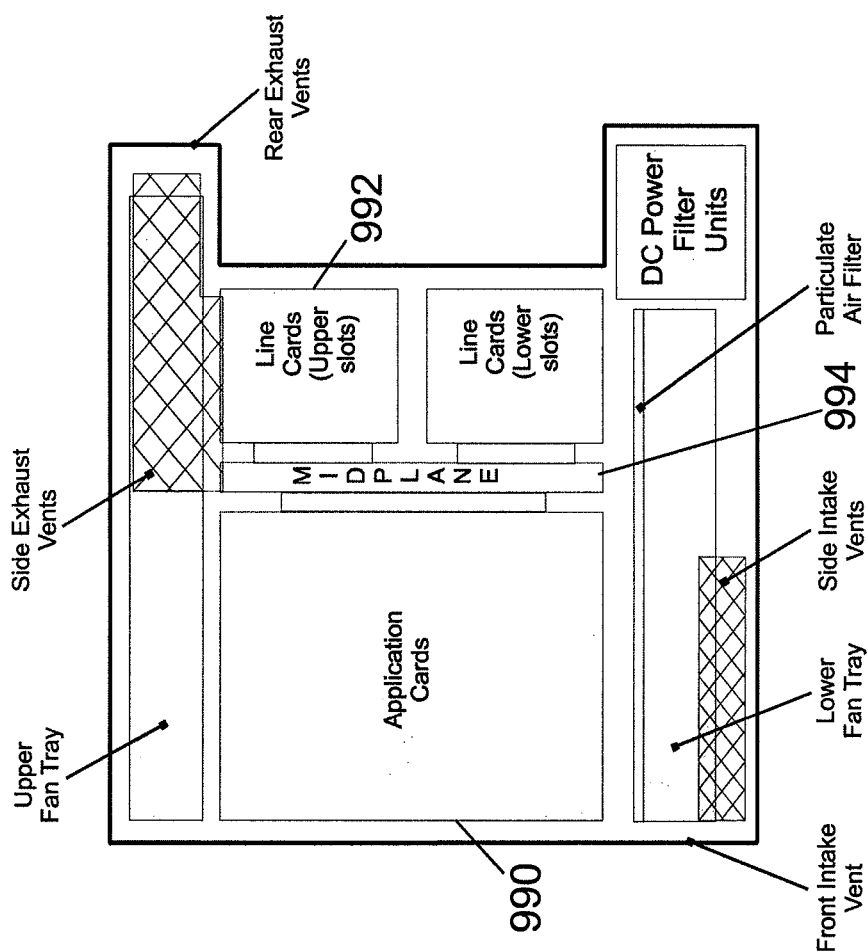
FIG. 4 illustrates a chassis in accordance with certain embodiments.

The features of a chassis that implements a gateway, in accordance with some embodiments, are further described below. FIG. 4 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed:

1. A method comprising:
    maintaining information about mobile terminals communicating in a network, the network including a gateway in communication with radio access networks (RANs) and capable of wireless communication with a plurality of mobile terminals, the mobile terminals including a first mobile terminal and a second mobile terminal, wherein the information about the mobile terminals includes location information of the first and second mobile terminals;
    receiving, by the gateway from a policy server, rules specifying conditions under which a packet flow can be confined to two mobile terminals and an evolved Node B (eNodeB) to be coupled to the two mobile terminals;
    determining, at the gateway, based at least in part on the location information of the first and second mobile terminals, whether the first mobile terminal and the second mobile terminal are communicating in a packet flow through a same evolved Node B (eNodeB) in a first radio access network (RAN);
    in response to a determination that the first mobile terminal and the second mobile terminal are communicating in a packet flow through a same eNodeB, sending control information, pursuant to the rules, to the eNodeB to cause the packet flow between the first mobile terminal and the second mobile terminal to be routed locally through the eNodeB without passing through the gateway to cause the packet flow to be confined to the first mobile terminal, the second mobile terminal, and the eNodeB; and
    wherein the location information of the first and second mobile terminals includes enhanced cell global identifiers (ECGIs) and wherein the determining whether the first mobile terminal and the second mobile terminal are communicating in a packet flow through the same eNodeB includes determining whether an ECGI value assigned to the first mobile terminal is identical to an ECGI value assigned to the second mobile terminal.

2. The method of claim 1, wherein the network has a serving gateway and a packet gateway, the serving gateway in communication with the packet gateway and a plurality of RANs including the first RAN and a second RAN and wherein, in response to the second mobile terminal being handed over from the first RAN to the second RAN, the network causing the packet flow to be routed through the first RAN, the serving gateway and a second RAN, without passing through the packet gateway.

3. The method of claim 1, wherein the rules indicate that the network can allow the packet flow to be routed locally through the eNodeB without passing through the gateway when both the first mobile terminal and the second mobile terminal are communicating through the same eNodeB.

4. The method of claim 1, wherein the location information of the first and second mobile terminals is maintained at a policy and charging rules function (PCRF).

5. The method of claim 1, wherein the network includes a serving gateway in communication with one or more RANs, and a packet gateway in communication with one or more serving gateways.

6. The method of claim 1, further comprising, if routed locally through the eNodeB, performing, at the eNodeB, lawful interception and one or more of updating statistics and billing.

7. The method of claim 1, wherein a policy and charging rules function (PCRF), which is in communication with the gateway, maintains a set of ECGI values assigned to the mobile terminals and the gateway caches a set of mobile terminals with a same ECGI value.

8. The method of claim 1, wherein the control information is sent to the eNodeB from a mobility management entity (MME) that is in communication with the gateway.

9. The method of claim 1, wherein, as the second mobile terminal is being handed over from the first RAN to the second RAN, the eNodeB receives a control message from a mobility management entity (MME) in communication with a target eNodeB in the second RAN, the control message including an instruction for the eNodeB to stop the local routing of the packet flow.

10. A gateway in communication with radio access networks (RANs) and capable of wireless communication with a plurality of mobile terminals, the gateway comprising:
    a memory capable of storing data; and
    a processor configured for using the data such that the gateway can:
        maintain information about the plurality of mobile terminals including location information of the first and second mobile terminals, the plurality of mobile terminals including a first mobile terminal and a second mobile terminal;
        receive, from a policy server, rules specifying conditions under which a packet flow can be confined to two mobile terminals and an evolved Node B (eNodeB) to be coupled to the two terminals;
        determine, based at least in part on the location information of the first and second mobile terminals, whether the first mobile terminal and the second mobile terminal are communicating in a packet flow through a same evolved Node B (eNodeB) in a first radio access network (RAN);
    in response to a determination that the first mobile terminal and the second mobile terminal are communicating in a packet flow through a same eNodeB, send control information, pursuant to the rules, to the eNodeB to cause the packet flow between the first mobile terminal and the second mobile terminal to be routed locally through the eNodeB without passing through the gateway to cause the packet flow to be confined to the first mobile terminal, the second mobile terminal, and the eNodeB; and
    wherein the location information of the first and second mobile terminals includes enhanced cell global identifiers (ECGIs) and wherein the determining whether the first mobile terminal and the second mobile terminal are communicating in a packet flow through the same eNodeB includes determining whether an ECGI value assigned to the first mobile terminal is identical to an ECGI value assigned to the second mobile terminal.

11. The gateway of claim 10, wherein the gateway comprises a serving gateway and a packet gateway, wherein the serving gateway is in communication with the packet gateway and a plurality of RANs including the first RAN and a second RAN, and wherein, in response to the second mobile terminal being handed over from the first RAN to the second RAN, the serving gateway causes the packet flow to be routed through the first RAN, the serving gateway, and the second RAN, without passing through the packet gateway.

12. The gateway of claim 10, wherein the rules that the packet flow is allowed to be routed locally through the eNodeB without passing through the gateway when both the first mobile terminal and the second mobile terminal are communicating through the same eNodeB.

13. The gateway of claim 10, wherein the location information of the first and second mobile terminals is maintained at a policy and charging rules function (PCRF).

14. The gateway of claim 10, wherein a policy and charging rules function (PCRF), which is in communication with the gateway, maintains a set of ECGI values assigned to the mobile terminals and the gateway caches a set of mobile terminals with a same ECGI value.

15. The gateway of claim 10, wherein the control information is sent to the eNodeB from a mobility management entity (MME) that is in communication with the gateway.

16. The gateway of claim 10, wherein, as the second mobile terminal is being handed over from the first RAN to the second RAN, the eNodeB receives a control message from a mobility management entity (MME) in communication with a target eNodeB in the second RAN, the control message including an instruction for the eNodeB to stop the local routing of the packet flow.

17. The gateway of claim 10, wherein the processor is further configured for using the data such that the gateway can also perform, at the eNodeB, lawful interception and one or more of updating statistics and billing, if the packet flow between the first mobile terminal and the second mobile terminal is routed locally through the eNodeB.

18. A computer program product residing on a non-transitory computer readable medium, the computer program product comprising computer executable instructions which, when executed by one or more processors in an apparatus, cause the apparatus to perform a method, the method comprising:

maintaining information about mobile terminals communicating in a network, the network including a gateway in communication with radio access networks (RANs) capable of wireless communication with a plurality of mobile terminals, the mobile terminals including a first mobile terminal and a second mobile terminal, wherein the information about the mobile terminals includes location information of the first and second mobile terminals;

receiving, by the gateway from a policy server, rules specifying conditions under which a packet flow can be confined to two mobile terminals and an evolved Node B (eNodeB) to be coupled to the two mobile terminals;

determining, at the gateway, based at least in part on the location information of the first and second mobile terminals, whether the first mobile terminal and the second mobile terminal are communicating in a packet flow through a same evolved Node B (eNodeB) in a first radio access network (RAN);

in response to a determination that the first mobile terminal and the second mobile terminal are communicating in a packet flow through a same eNodeB, sending control information, pursuant to the rules, to the eNodeB to cause the packet flow between the first mobile terminal and the second mobile terminal to be routed locally through the eNodeB without passing through the gateway to cause the packet flow to be confined to the first mobile terminal, the second mobile terminal, and the eNodeB; and wherein the location information of the first and second mobile terminals includes enhanced cell global identifiers (ECGIs) and wherein the determining whether the first mobile terminal and the second mobile terminal are communicating in a packet flow through the same eNodeB includes determining whether an ECGI value assigned to the first mobile terminal is identical to an ECGI value assigned to the second mobile terminal.

\* \* \* \* \*